(12) United States Patent
Lin

(10) Patent No.: US 8,568,040 B2
(45) Date of Patent: Oct. 29, 2013

(54) OPTICAL FIBER CONNECTOR HAVING STRENGTHENING UNIT

(75) Inventor: Chun-Yu Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 690 days.

(21) Appl. No.: 12/749,468

(22) Filed: Mar. 29, 2010

(65) Prior Publication Data

US 2011/0069930 A1    Mar. 24, 2011

(30) Foreign Application Priority Data

Sep. 18, 2009 (CN) .......................... 2009 1 0307274

(51) Int. Cl.
*G02B 6/36* (2006.01)

(52) U.S. Cl.
USPC .............................................. 385/88; 385/86

(58) Field of Classification Search
USPC ..................................................... 385/88, 86
See application file for complete search history.

(56) References Cited

U.S. PATENT DOCUMENTS

| | | | | |
|---|---|---|---|---|
| 4,327,964 A | * | 5/1982 | Haesly et al. .................... | 385/78 |
| 4,458,984 A | * | 7/1984 | Roberts et al. .................. | 385/70 |
| 4,691,985 A | * | 9/1987 | Shank et al. .................... | 385/84 |
| 5,239,601 A | * | 8/1993 | Denis et al. .................... | 385/49 |
| 5,452,386 A | * | 9/1995 | van Woesik ..................... | 385/72 |
| 5,611,014 A | * | 3/1997 | Basavanhally ................... | 385/90 |
| 5,875,274 A | * | 2/1999 | Stein .............................. | 385/49 |
| 5,875,275 A | * | 2/1999 | Evans et al. .................... | 385/88 |
| 6,106,159 A | * | 8/2000 | Caplan et al. ................... | 385/87 |
| 6,203,211 B1 | * | 3/2001 | Cheng ............................ | 385/78 |
| 6,331,081 B1 | * | 12/2001 | Ohtsuka et al. ................. | 385/85 |
| 6,634,800 B2 | * | 10/2003 | Suematsu et al. ............... | 385/80 |
| 2001/0053266 A1 | * | 12/2001 | Suematsu et al. ............... | 385/80 |
| 2006/0257079 A1 | * | 11/2006 | Ohtsuka et al. ................. | 385/86 |
| 2010/0310214 A1 | * | 12/2010 | Miyadera et al. ............... | 385/91 |

FOREIGN PATENT DOCUMENTS

JP          05107425 A    *  4/1993   .............. G02B 6/30
JP          2005-316292      11/2005

* cited by examiner

*Primary Examiner* — Charlie Peng
*Assistant Examiner* — Peter Radkowski
(74) *Attorney, Agent, or Firm* — Altis & Wispro Law Group, Inc.

(57) ABSTRACT

An optical fiber connector includes a shell, a lens and a strengthening unit. The shell includes a blind hole extended along a first direction for receiving a fiber and a through hole communicated with the blind hole and extended along a second direction perpendicular to the first direction. The lens is formed on the shell to align with a bottom of the blind hole. The lens is capable of optically coupling with the fiber in the blind hole. The strengthening unit is formed in the through hole.

10 Claims, 4 Drawing Sheets

OPTICAL FIBER CONNECTOR HAVING STRENGTHENING UNIT

BACKGROUND

1. Technical Field

The present disclosure relates to an optical fiber connector having a strengthening unit in a detecting opening.

2. Description of Related Art

Optical fiber connectors each normally include a connecting shell and a lens. The connecting shell typically includes a blind hole for receiving an optical fiber. It is well known that an opening is provided in the optical fiber connectors for detecting an assembly process of inserting the optical fiber into the blind hole. However, the existence of the opening corresponding to the blind hole decreases a strength character of the optical fiber connectors.

Therefore, a new optical fiber connector is desired to overcome the above-described shortcoming.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various disclosed embodiments of the present disclosure in detail, wherein like numerals refer to like elements throughout.

Figure 1:
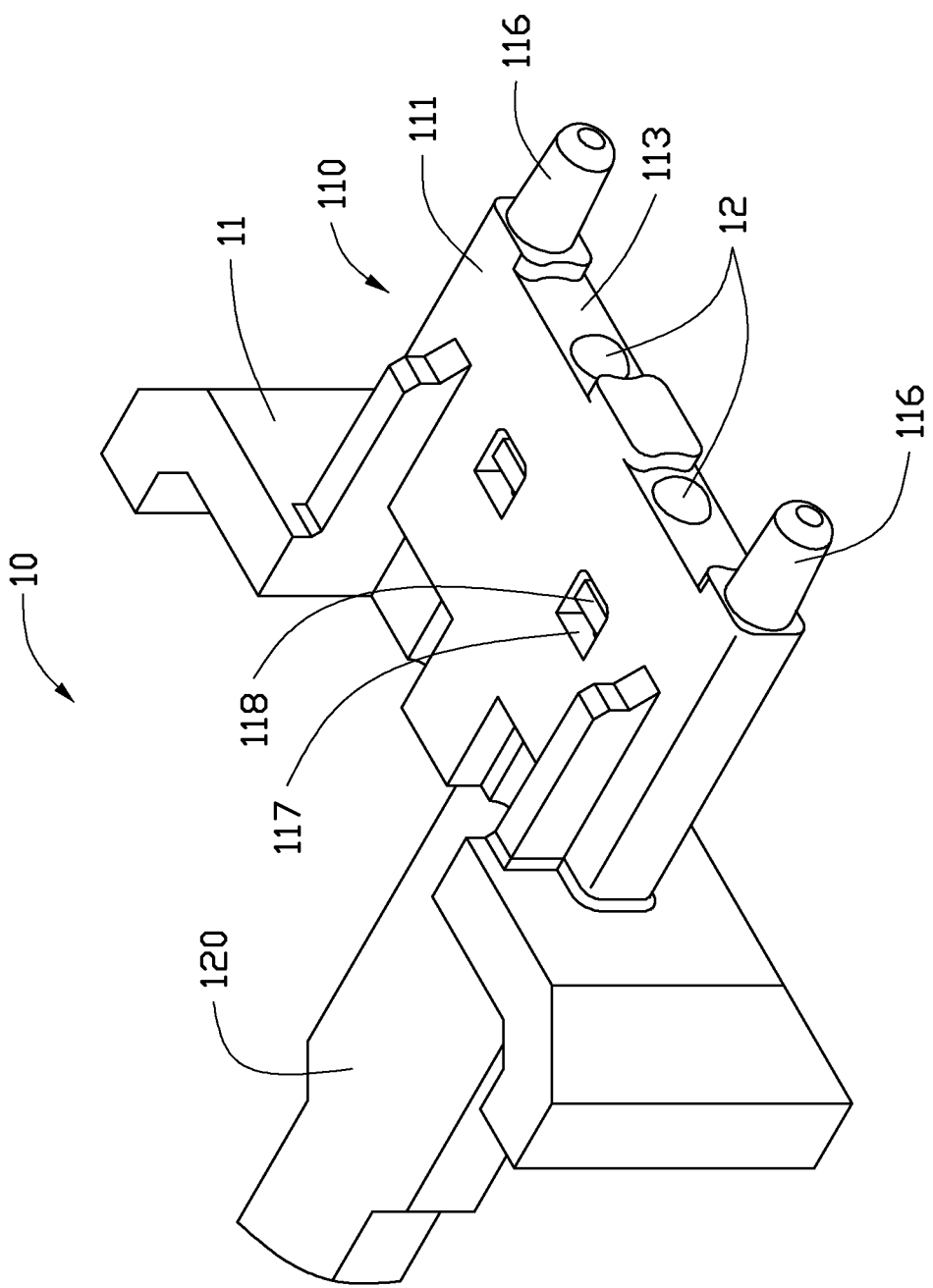
FIG. 1 is a schematic isometric view of an optical fiber connector according to a first embodiment of the present disclosure.
Figure 2:
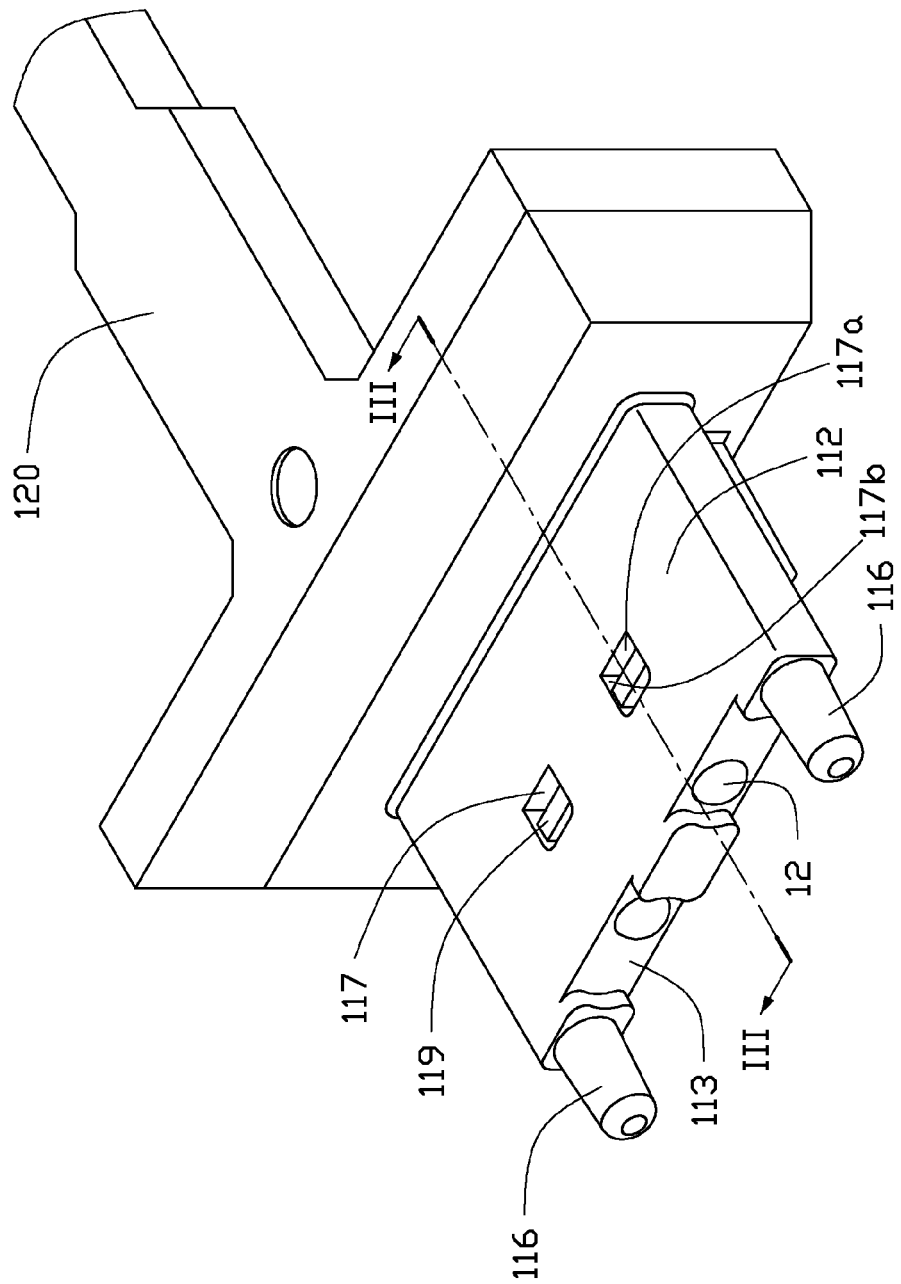
FIG. 2 is a schematic isometric view of the optical fiber connector of FIG. 1 in a different view angle.
Figure 3:
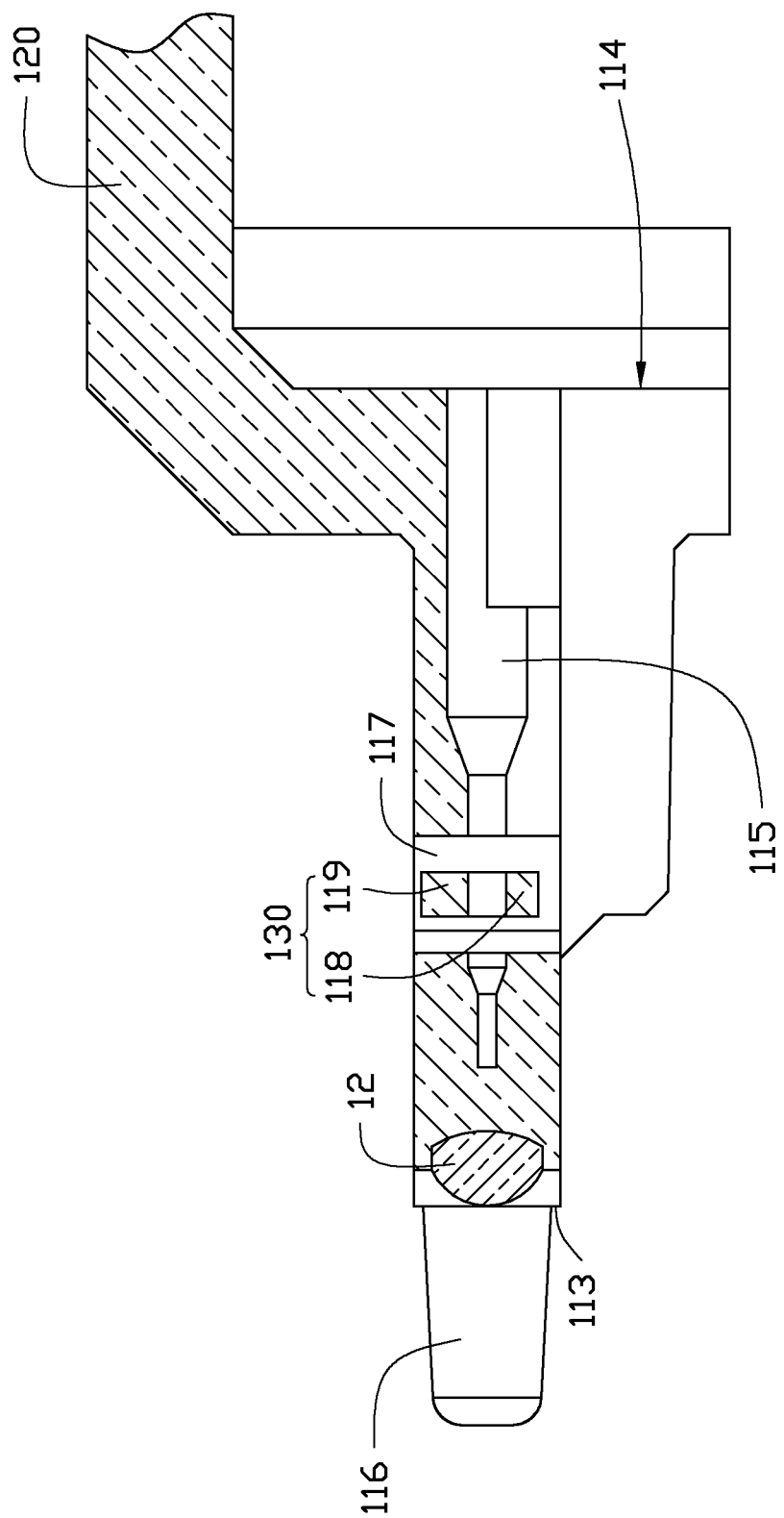
FIG. 3 is a cross-sectional view of the optical fiber connector of FIG. 2 taken along line III-III.

Referring to FIGS. 1 to 3, a schematic isometric view of an optical fiber connector 10 according to a first embodiment of the present disclosure is shown. The optical fiber connector 10 includes a shell 11 and two lenses 12.

The shell 11 is approximately formed in a square fashion and includes a body 110 and a handle 120 connected to the body 110. The body 110 includes a first surface 111, a second surface 112, a third surface 113, and a fourth surface 114. The first, third, second, and fourth surfaces 111, 113, 112, and 114 are connected end to end correspondingly. The first and the second surfaces 111 and 112 are opposite to each other and arranged in parallel to an optical axis of the optical fiber connector 10. The third and the fourth surfaces 113 and 114 are opposite to each other and arranged perpendicular to the optical axis of the optical fiber connector 10.

The body 110 further defines two blind holes 115 parallel to the axis of the optical fiber connector 10. The blind holes 115 are configured for receiving the optical fiber (not shown). Each blind hole 115 extends from the fourth surface 114 towards the third surface 113 such that a bottom of each blind hole 115 is positioned near to the third surface 113.

The handle 120 is formed on the fourth surface 114 and extends far from the third surface 113. The handle 120 is convenient for an operator to hold the optical fiber connector 10 and insert the body 110 of the optical fiber connector 10 into an optical fiber socket of an external device, such as a notebook computer, or a digital camera, or a high definition television.

The lenses 12 are positioned in the third surface 113 and aligned with ends of the optical fiber in the blind holes or the bottom of the blind holes 115, respectively. Two column-shaped plugs 116 are provided to protrude from the third surface 113 at opposite sides of the lenses 12. In one embodiment, the lenses 12 are correspondingly optically coupled with the optical fibers via the body 110. In an alternative embodiment, each blind hole 115 is replaced by a through hole and each lens 12 is arranged to seal the through hole at the third surface 113. Therefore, the lenses 12 are optically coupled with the optical fibers via air or directly contacted with the end of the optical fibers.

The body 110 defines two through holes 117 extended from the first surface 111 to the second surface 112. In one embodiment, each of the through holes 117 perpendicularly crosses a corresponding blind hole 115 and communicates with the corresponding blind hole 115. That is, a central axis of each through hole 117 is perpendicular to a central axis of each blind hole 115. When the optical fibers are assembled into the blind holes 115, the through holes 117 are use to observe the assembly of the fibers.

A strengthening unit 130 is positioned in each through hole 117. The strengthening unit 130 may include a stripe-shaped first rib 118 and a second rib 119. In one embodiment, each of the through holes 117 is square shaped and has a pair of parallel first side walls 117a and a pair of parallel second side walls 117b. The first side walls 117a are perpendicularly connected to the second side walls 117b. The first side walls 117a are parallel to the third surface 113. That is, the first side walls 117a are perpendicular to the central axis of the blind hole 115. The second side walls 117b are perpendicular to the third surface 113. That is, the second side walls 117b are parallel to the central axis of the blind hole 115. Each of the first rib 118 and the second rib 119 is arranged in parallel to the third surface 113 and extends to connect the second side walls 117b. In one embodiment, the first rib 118 and the second rib 119 are spaced from each other and positioned respectively near to the first surface 111 and the second surface 112. Thus, a space configured for receiving the fiber is defined between the first rib 118 and the second rib 119. In one embodiment, the first rib 118 and the second rib 119 are integrally formed with the body 110. Because the through hole 117 includes the first rib 118 and the second rib 119 therein for embracing and supporting the fiber, a configuration of the body 110 is strengthened.

In alternative embodiments, a number of the blind holes 115 are four, six or eight. The through holes 117 each having the first rib 118 and the second rib 119 formed therein are defined in the body 110. The through holes 117 are spatially corresponded to the blind holes 115.

Figure 4:
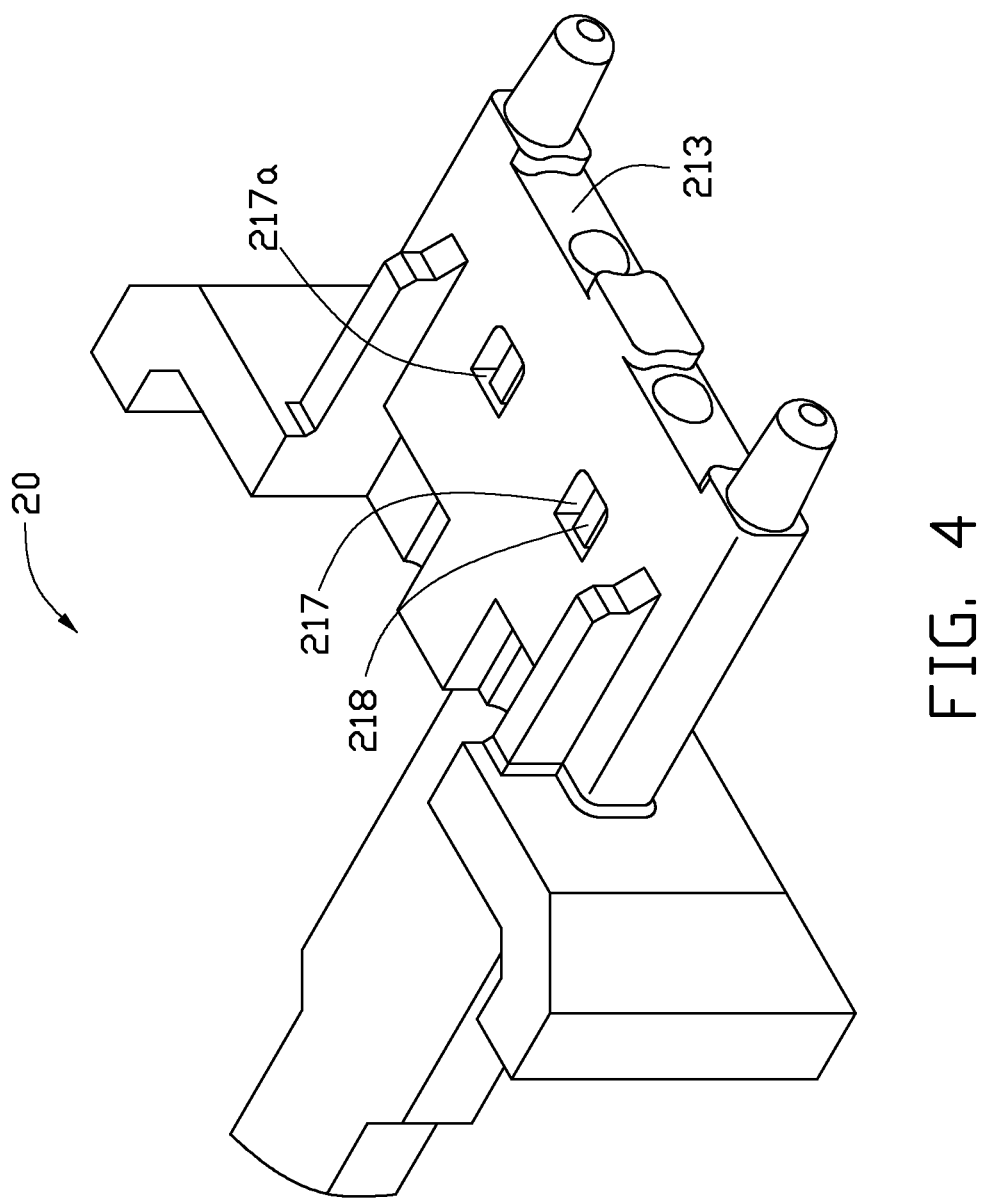
FIG. 4 is a schematic isometric view of an optical fiber connector according to a second embodiment of the present disclosure.

Referring to FIG. 4, an optical fiber connector 20 according to a second embodiment of the present disclosure is shown. The optical fiber connector 20 is similar to the optical fiber connector 10 of FIGS. 1 through 3, except that a through hole 217 includes only one first rib 218 extending along the axis of a fiber, perpendicular to a third surface 213. The through hole 217 has a pair of parallel first side walls 217a, which are parallel to the third surface 213. The first rib 218 is connected to the first side walls 217a. In one embodiment, the first rib 218 is fixed in the through hole 217 at the two opposite first side walls 217a of the through hole 217 by glue. In another embodiment, the first rib 218 is integrally formed with a body of the optical fiber connector 20. The first rib 218 can also extend along a direction crossing with the third surface 213 or the axis of a fiber at an acute angle such as 30 degrees or 60 degrees.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. An optical fiber connector, comprising:
    a shell comprising:
        a body;
        a blind hole defined in the body and extending along a first direction for receiving an optical fiber; and
        a through hole defined in the body, extending along a second direction perpendicular to the first direction, comprising a pair of parallel side walls perpendicular to the first direction, and communicated with the blind hole;
    a lens positioned on the body and aligned with a bottom of the blind hole, the lens capable of optically coupling with the optical fiber received in the blind hole; and
    a strengthening unit formed as a rib positioned in the through hole, the strengthening unit extending along a third direction parallel to the first direction and being connected to the side walls.

2. The optical fiber connector of claim 1, wherein the strengthening unit is fixed in the through hole by glue.

3. The optical fiber connector of claim 1, wherein the strengthening unit and the body are integrally formed with one another.

4. The optical fiber connector of claim 1, wherein the body comprises a first, a third, a second and a fourth surfaces connected end to end correspondingly, the first and the second surfaces are opposite to each other and perpendicular to the second direction, and the third and the fourth surfaces are opposite to each other and perpendicular to the first direction.

5. The optical fiber connector of claim 4, wherein an entrance of the blind hole is formed on the fourth surface of the body.

6. The optical fiber connector of claim 5, wherein the shell further comprises a handle formed on the fourth surface of the body.

7. The optical fiber connector of claim 5, wherein the lens is formed in the third surface of the body.

8. The optical fiber connector of claim 6, wherein the shell further comprises two column-shaped plugs protruding from the third surface at opposite sides of the lens.

9. An optical fiber connector, comprising:
    a shell comprising:
        a body;
        a first through hole defined in the body and extending along a first direction for receiving an end of an optical fiber; and
        a second through hole defined in the body, extending along a second direction perpendicular to the first direction, comprising a pair of parallel side walls perpendicular to the first direction, and crossing and communicated with a middle portion of the first through hole;
    a lens covering an entrance of the first through hole and capable of optically coupling with the end of the optical fiber in the first through hole; and
    a strengthening unit formed as a rib in the second through hole, the rib extending along a third direction parallel to the first direction and being connected to the side walls.

10. The optical fiber connector of claim 9, wherein the body comprises a first, a third, a second and a fourth surfaces connected end to end correspondingly, the first and the second surfaces are opposite to each other and perpendicular to the second direction, and the third and the fourth surfaces are opposite to each other and perpendicular to the first direction.

* * * * *